United States Patent
Iwase et al.

(10) Patent No.: US 6,250,268 B1
(45) Date of Patent: Jun. 26, 2001

(54) CAM CHAIN GUIDE ATTACHMENT STRUCTURE

(75) Inventors: Noritoshi Iwase; Yoshihiro Tezuka; Katsunori Takahashi; Toru Iizuka, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/432,089

(22) Filed: Nov. 2, 1999

(30) Foreign Application Priority Data

Nov. 2, 1998 (JP) .................................................. 10-312476

(51) Int. Cl.$^7$ ................................. F16H 7/18; B62M 9/16
(52) U.S. Cl. ...................... 123/90.31; 474/111; 474/140; 474/150
(58) Field of Search ............................. 123/90.31, 198 R; 474/111, 140, 148, 150

(56) References Cited

U.S. PATENT DOCUMENTS

| | | | |
|---|---|---|---|
| 4,832,664 | * 5/1989 | Groger et al. | 474/111 |
| 5,318,482 | * 6/1994 | Sato et al. | 474/111 |
| 5,366,418 | * 11/1994 | Fukushima et al. | 474/111 |
| 5,665,019 | * 9/1997 | Sheffer et al. | 474/111 |
| 6,013,000 | * 1/2000 | Moretz | 474/111 |
| 6,095,938 | * 8/2000 | Kumakura | 474/111 |

FOREIGN PATENT DOCUMENTS 10-77905    3/1998  (JP) .

* cited by examiner

*Primary Examiner*—Weilun Lo
(74) *Attorney, Agent, or Firm*—Birch, Stewart, Kolasch & Birch, LLP

(57) ABSTRACT

To effectively reduce noise caused by an attachment part of a cam chain guide without increasing a pressing force of a cam chain tensioner more than is necessary. A cam chain guide for slidably guiding a cam chain at a valve gear of a four cycle engine is made of resin. An attachment hole for an attachment bolt is provided at an attachment end section for the crankcase. Side surface projections are provided equally spaced at the periphery of an attachment surface surrounding the attachment hole so as to project from a normal surface. Annular recesses are formed at the peripheries of each of the side surface projections. Furthermore, inner surface projections are provided at the inner peripheral surface of the attachment hole equally spaced about the periphery so as to project in a central direction.

18 Claims, 5 Drawing Sheets

CAM CHAIN GUIDE ATTACHMENT STRUCTURE

BACKGROUND OF THE INVENTION

1. Field of the Invention

The present invention relates to an attachment structure for a cam chain of a valve gear for a four-cycle engine.

2. Description of Related Art

Conventionally, a cam chain guide for guiding a cam chain in a manner that allows the cam chain to slide and a cam chain tensioner for maintaining tension of the cam chain are provided at a valve gear of a four-cycle engine (for example, refer to Japanese Patent Laid-open Publication No. Hei. 10-77905). One end of such a chain guide is supported by a bolt at an attachment member such as a crankcase etc.

A certain amount of attachment rattling occurs at the cam chain support part which causes noise to occur in accompaniment with vibrations of the moving cam chain, with this noise being particularly noticeable when the engine is rotating at a high-speed. The pressing force of the cam chain tensioner can, however, be regulated in order to prevent this noise so as to make the cam chain more tense, but this causes friction between the cam chain tensioner and the cam chain to increase which in turn influences the output of the engine.

SUMMARY OF THE INVENTION

It is therefore the object of the present invention to effectively reduce the noise arising at the cam chain guide attachment part without increasing the pressing force of the cam chain guide more than is necessary.

In order to resolve the aforementioned problems, in a first aspect of the present invention, a cam chain guide attachment structure for a cam chain guide for slidably guiding a cam chain is provided at a valve gear of an engine and is supported at one end by an attachment member. Projections projecting a prescribed amount towards the attachment member are then provided at an attachment surface facing the attachment member at an attachment end section of the cam chain guide.

In a second aspect of the present invention, in addition to the first aspect of the present invention, annular recesses for accepting deformation of the projections are formed along the projections.

In a third aspect of the present invention, in addition to the first aspect of the present invention, the projections are formed on a side surface of the cam chain guide. This means that the cam chain guide side surface is then substantially parallel to the plane of rotation of the cam chain.

In a fourth aspect of the present invention, in addition to the first aspect of the present invention, the cam chain guide has an attachment hole at the attachment end section, is supported by the attachment member fitting into the attachment hole, and the projections are formed at an inner peripheral surface of the attachment hole.

In a fifth aspect of the present invention, in addition to the first aspect of the present invention, the cam chain guide is made of resin and the projections are integrally formed with the cam chain guide.

In a sixth aspect of the present invention, in addition to the first aspect of the present invention, the cam chain guide is made of metal, and the projections are formed integrally at the attachment end section by baking a rubber member.

According to the first aspect of the present invention, when the attachment end section of the cam chain guide is supported at the attachment member, projections provided at the attachment surface of the attachment end section project a prescribed amount in the direction of the attachment member. This portion is then deformed while coming into contact with the attachment member side first and attachment rattling is therefore eliminated. Noise caused by the attachment part of the cam chain guide can therefore be effectively reduced and the effect of the pressing force of the cam chain tensioner on the output of the engine can be reduced, since the pressing force of the cam chain tensioner does not have to be increased more than is necessary.

According to the second aspect of the present invention, when the attachment end section of the cam chain guide is supported at the attachment member, even if the projections deform, this deformation is accepted by annular recesses formed at the peripheries of the projections and the relationship of the dimensions of the attachment portion therefore does not change.

According to the third aspect of the present invention, since the projections are formed at a side surface of the cam chain guide, attachment is such that the projections are simultaneously deformed when the cam chain guide is attached from the side.

According to the fourth aspect of the present invention, when the attachment member is fitted into the attachment hole provided at the attachment end section of the cam chain guide, the projections formed at the inner peripheral surface of the attachment hole come into contact with the outer periphery of the attachment member and attachment rattle in the radial direction of the attachment member is annulled.

According to the fifth aspect of the present invention, the projections can be integrally formed at the time of molding by making the cam chain guide out of resin.

According to the sixth aspect of the present invention, even if the cam chain guide is made of metal, a rubber member is baked onto the attachment end section. The projections can therefore be integrally formed with this rubber member and the present invention can therefore also be applied to a metal cam chain guide. The forming of the projections is straightforward and only requires small changes to a mold for baking the rubber member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
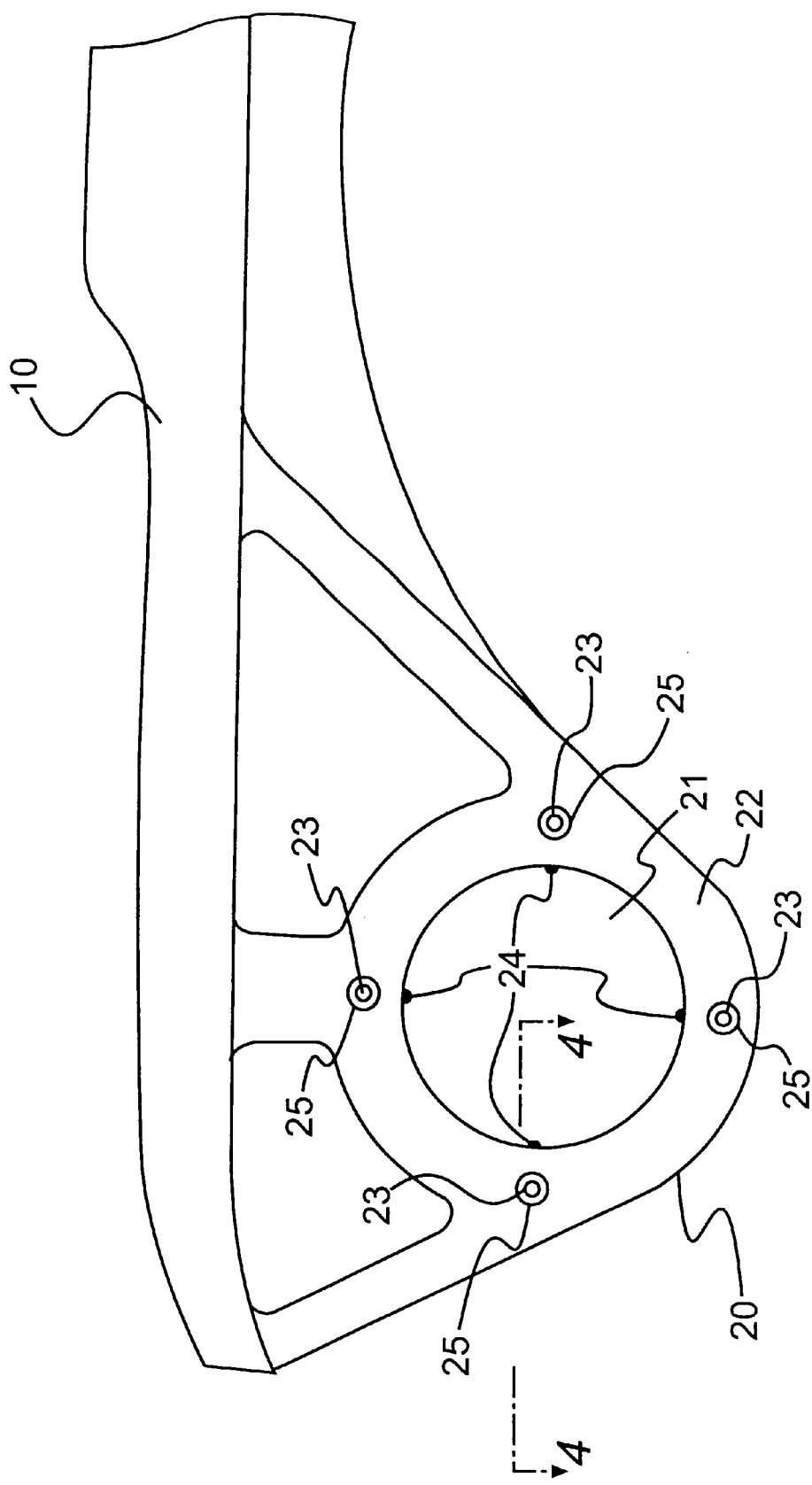
FIG. 1 is a side view showing an end part of a cam chain guide attachment from the direction of attachment according to the present invention.

The following is a description, based on the drawings, of an embodiment of the present invention applied to a motorcycle. First, an outline of the structure of the engine as a whole will be described with reference to FIG. 2. The engine illustrated is a DOHC four-cycle engine, with numeral 1 indicating a cylinder head, numeral 2 indicating a cylinder block and numeral 3 indicating a crankcase. A cam chain 5 is then housed within a cam chain chamber 4 provided to one side of the cylinder head 1, cylinder block 2 and crankcase 3.

The cam chain 5 is wrapped around a drive sprocket 7 formed at one end of the crankshaft 6 (refer to FIG. 3) and each cam sprocket 9 of two camshafts 8 so as to form the drive transmission mechanism of the drive gear for transmitting the rotation of the crankshaft 6 to each of the camshafts 8.

Figure 2:
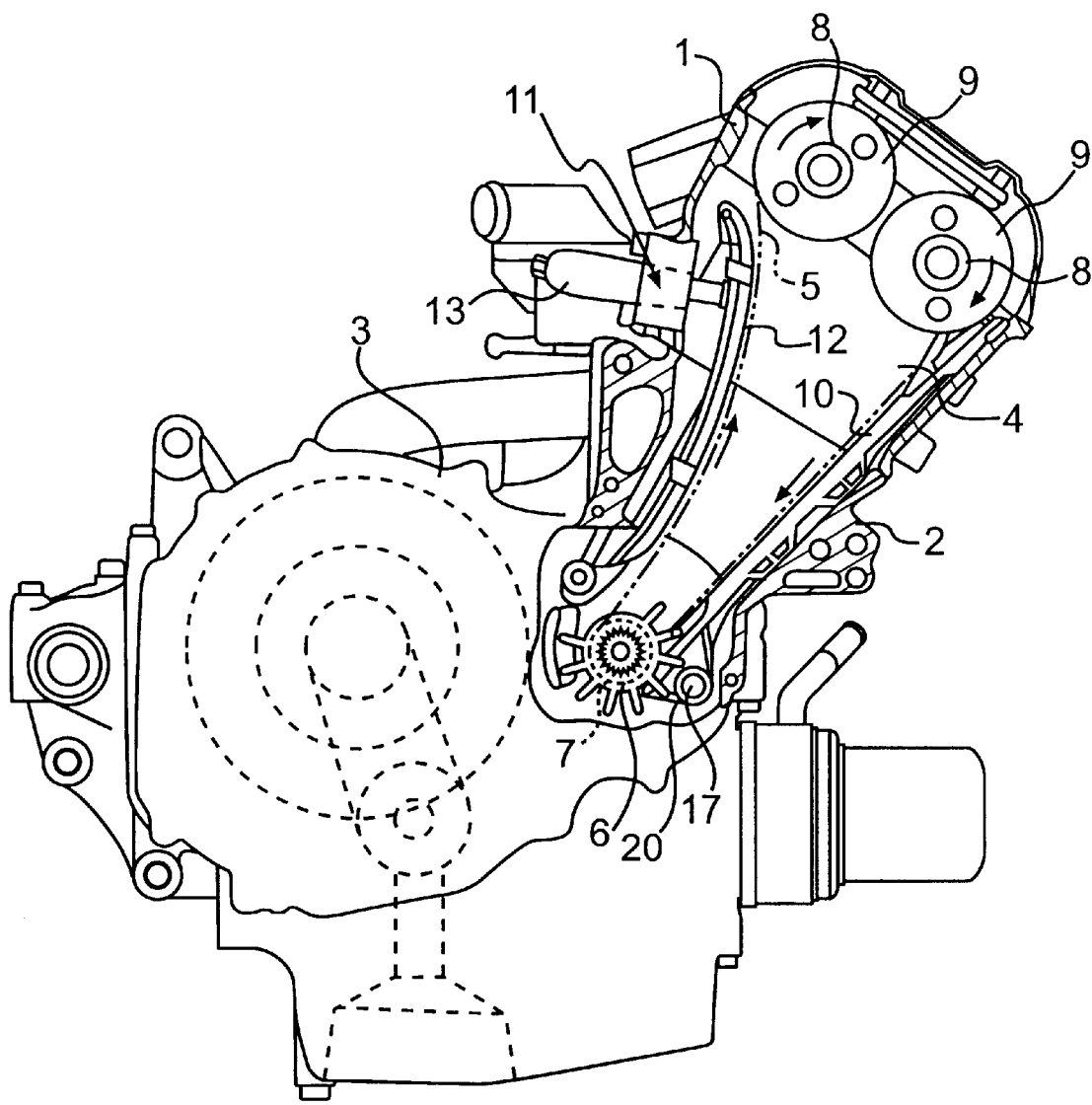
FIG. 2 is a view of an engine cut-away so as to show the valve gear.

The cam chain 5 rotates in the direction of the arrow in FIG. 2, the outer periphery of the side being pulled is guided so as to slide over the cam chain guide 10, and the outer periphery of the side being sent is pushed so as to be held at a fixed tension by the cam chain tensioner 11. One end of a slide section 12 of the cam chain tensioner 11 is attached to a regulator 13 for regulating the force of pushing, and the other end is attached to the crankcase 3 in a freely rotatable manner.

The cam chain guide 10 is entirely composed of an appropriate composite resin, with one end supported at the cylinder head 1 in the vicinity of the cam sprocket 9 and the other end being attached to the crankcase 3 via an attachment end section 20. A core member made of, for example, metal is inserted into the cam chain guide 10 along a lengthwise direction if necessary.

Figure 3:
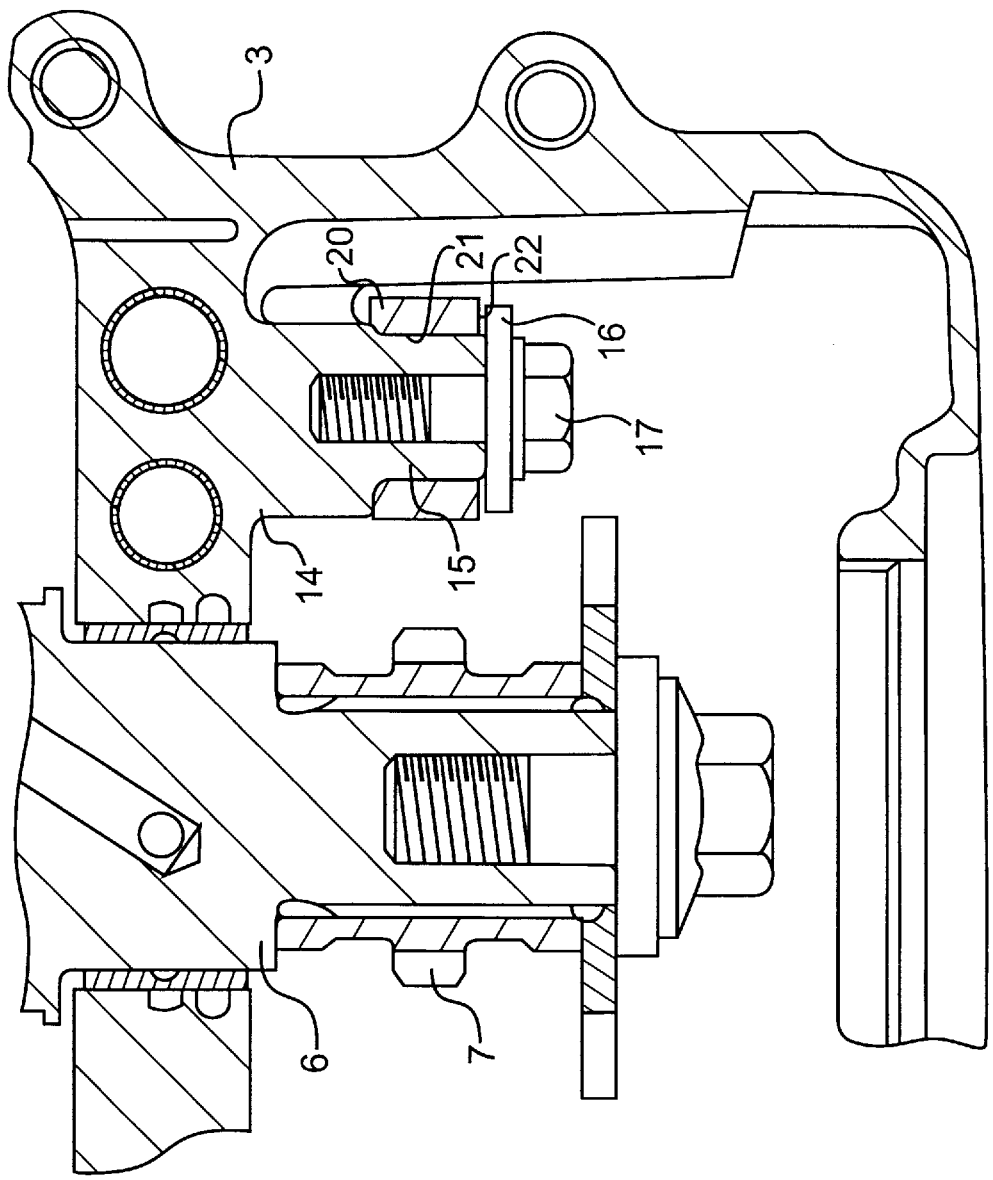
FIG. 3 is a view showing the cam chain guide attachment structure.

FIG. 3 shows an enlarged view of the cross-sectional structure of the attachment, with the attachment end section 20 being equipped with an attachment hole 21 into which a small diameter section 15 of a boss 14 integrally formed with the crankcase 3 is inserted. The attachment end section 20 is then supported at the crankcase 3 as a result of an attachment bolt 17 being fastened to the boss 14 from the side via a washer 16.

At the cam chain guide 10 of this embodiment, the side surface referred to in this application refers to both the side where the attachment end section 20 faces the washer 16 and the opposite side to this side, with the surface where the attachment end section 20 faces the washer 16 being the attachment surface 22. The direction of fastening the attachment bolt 17 is therefore the side direction, and the attachment member therefore comprises the boss 14, attachment bolt 17 and washer 16.

Figure 4:
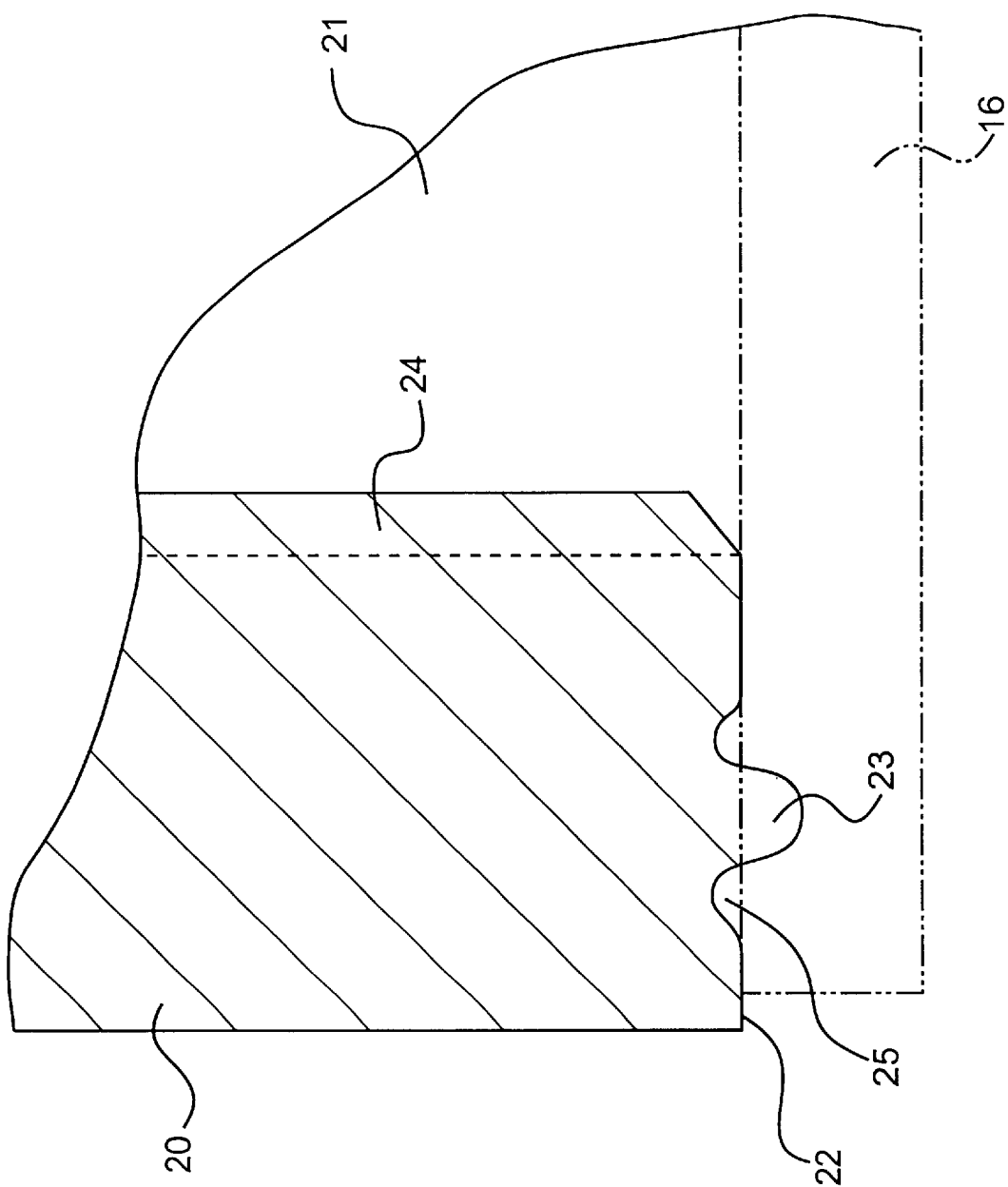
FIG. 4 is a cross-sectional view taken along line 4—4 of FIG. 1.

As can be understood form FIG. 1 and FIG. 4, side surface projections 23 and inner surface projections 24 are integrally formed at the inner surfaces of the attachment surface 22 and attachment hole 21 of the attachment end section 20. Portions of the side surface projections 23 that are easily deformed when coming into contact with the washer 16 by the fastening force of the attachment bolt 17 project a prescribed amount from the normal surface of the attachment surface 22 and annular recesses 25 are engraved in the normal surface so as to surround the side surface projections 23 (FIG. 4).

Inner surface projections 24 are integrally formed at the inner surface of the attachment hole 21 so as to be in an axial direction and project a prescribed amount in a central direction. The extent of these projections is set to allow deformation that enables the small diameter section 15 of the boss 14 to be inserted within the attachment hole 21. In this case, the inner surface of the attachment hole 21 is a normal surface of the attachment surface, with the exception of the inner surface projections 24.

An appropriate number of side surface projections 23 and the inner surface projections 24 are formed preferably at equal intervals along the periphery of the attachment hole 21. In this embodiment, four of each are formed at ninety-degree intervals.

The following is a description of the operation of the present invention. In order to attach the attachment end section 20 of the cam chain guide 10 using the attachment bolt 17 as shown in FIG. 3, first, the small diameter section 15 of the boss 14 is fitted into the attachment hole 21. At this time, the inner surface projections 24 come into contact with the outer peripheral surface of the small diameter section 15 fitting within the attachment hole 21 and deform while coming into close contact. Attachment raffle occurring in the radial direction of the boss 14 can therefore be nullified.

When the attachment bolt 17 is fastened via the washer 16, the side surface projections 23 coming into contact with the washer 16 deform while coming into contact with the washer 16 due to the fastening force so as to eliminate attachment rattle occurring in the fastening direction and the side surface projections 23 are simultaneously made to deform as a result of fastening of the attachment bolt 17 from the side surfaces. Deformation of the side surface projections 23 does not require any special labor.

The side surface projections 23 are pushed down so as to be deformed by the washer 16. However, this deformation is accepted by the recesses 25 formed at the peripheries of the side surface projections 23. The relationship of the dimensions of the attachment section are therefore fixed.

At the attachment part of the attachment end section, attachment rattle is eliminated along the fastening direction and the radial direction of the attachment bolt 17. Noise caused by attachment rattle occurring at the attachment part of the attachment end section 20 can therefore be reduced even if the cam chain guide 10 and the sliding cam chain 5 oscillate.

Figure 5:
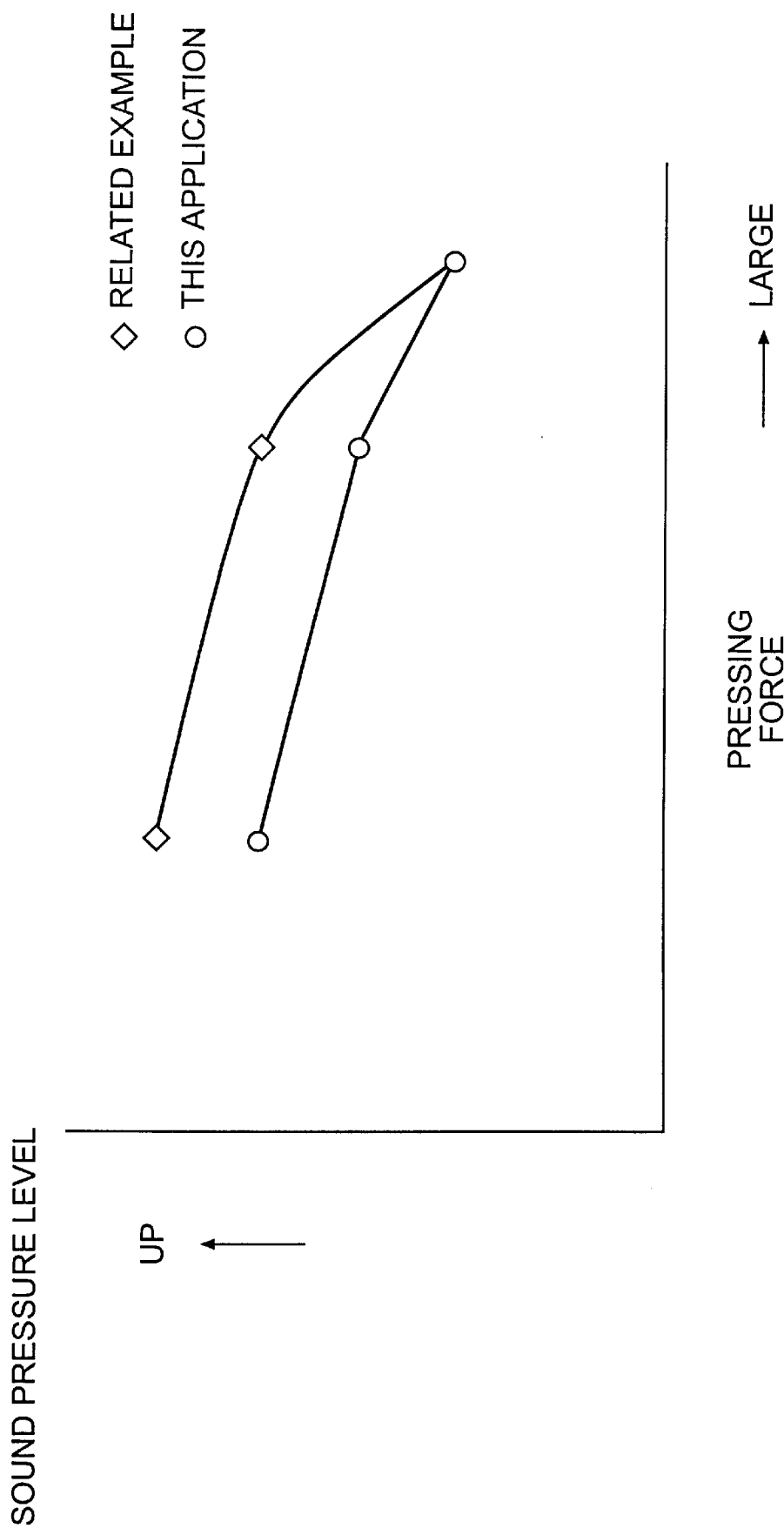
FIG. 5 is a graph showing noise reduction results.

FIG. 5 is a graph comparing the present invention and a related example that is not provided with the side surface projections 23 and the inner surface projections 24. In FIG. 5, the vertical axis is the sound pressure level of the noise and the horizontal axis is the pressing force of the cam chain tensioner 11. As can be understood from the graph, the present invention brings about a much more striking reduction in the sound pressure level of the noise for the same pressing force. It is therefore possible for a smaller pressing force to be sufficient while maintaining the same sound pressure level as the related art so that the friction between the cam chain tensioner 11 and the cam chain 5 is reduced and the engine output can be increased accordingly.

The present invention is by no means limited to the above embodiment, and various modifications are possible. For example, it is also possible for the inner surface projections 24 to come directly into contact with the outer peripheral surface of the attachment bolt 17 when the attachment bolt 17 is directly attached without using the boss 14. It is also possible to form a recess in the shape of a straight line along the inner surface projections 24 at the inner peripheral surface of the attachment hole 21.

It is also unnecessary to provide both of the side surface projections 23 and the inner surface projections 24 and the object of the present invention can still be achieved by employing either just the side surface projections 23 or just the inner surface projections 24. It is also possible to integrally form the projections at the outer peripheral surface in place of the inner surface projections 24 when the attachment structure is such that the outer peripheral section of the attachment end section of the cam chain guide is to be fitted from the attachment member side.

The present invention can also be easily applied even when the cam chain guide is metal by baking a rubber member at the attachment end section and integrally forming the side surface projections and the inner surface projections during baking.

Forming of the projections during this process can be achieved at little cost by simply making minor alterations to the baking mold. The same can also be said for the resin cam chain guide of the above embodiment, where there are only small alterations made to the attachment end section portion of the mold.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A cam chain guide attachment structure for a cam chain guide for slidably guiding a cam chain provided at a valve gear of an engine, said cam chain guide being supported at one end by an attachment member, said cam chain guide attachment structure comprising:

projections formed on an attachment surface of an attachment end section of the cam chain guide, said projections projecting a prescribed amount towards the attachment member; and the cam chain guide has an attachment hole at the attachment end section, the attachment member supporting the cam chain guide by fitting into the attachment hole, and said projections are formed at equal intervals along a periphery of the attachment hole.

2. The cam chain guide attachment structure of claim 1, wherein annular recesses for accepting deformation of the projections are formed adjacent the projections.

3. The cam chain guide attachment structure of claim 1, wherein said projections are formed on a side surface of the cam chain guide.

4. The cam chain guide attachment structure of claim 1, wherein said projections are formed at an inner peripheral surface of the attachment hole.

5. The cam chain guide attachment structure of claim 1, wherein the cam chain guide is made of resin and said projections are integrally formed with the cam chain guide.

6. The cam chain guide attachment structure of claim 1, wherein the cam chain guide is made of metal, and said projections are formed integrally at the attachment end section by a rubber member baked thereon.

7. A cam chain guide assembly for slidably guiding a cam chain provided at a valve gear of an engine, comprising:

a cam chain guide having an attachment end section attachable to a crankcase of the engine;

an attachment member for attaching the cam chain guide to the crankcase by the attachment end;

projections formed on an attachment surface of the attachment end section of the cam chain guide, said projections projecting a prescribed amount towards the attachment member; and the cam chain guide has an attachment hole at the attachment end section, the attachment member supporting the cam chain guide by fitting into the attachment hole, and said projections are formed at equal intervals along a periphery of the attachment hole.

8. The cam chain guide assembly of claim 7, wherein annular recesses for accepting deformation of the projections are formed adjacent the projections.

9. The cam chain guide assembly of claim 7, wherein said projections are formed on a side surface of the cam chain guide.

10. The cam chain guide assembly of claim 7, wherein said projections are formed at an inner peripheral surface of the attachment hole.

11. The cam chain guide assembly of claim 7, wherein the cam chain guide is made of resin and said projections are integrally formed with the cam chain guide.

12. The cam chain guide assembly of claim 7, wherein the cam chain guide is made of metal, and said projections are formed integrally at the attachment end section by a rubber member baked thereon.

13. A cam chain assembly for an engine, comprising:

a cam chain rotatably mountable to the engine;

a cam chain guide having an attachment end section attachable to a crankcase of the engine, said cam chain guide slidably guiding the cam chain at a valve gear of the engine;

an attachment member for attaching the cam chain guide to the crankcase by the attachment end;

projections formed on an attachment surface of the attachment end section of the cam chain guide, said projections projecting a prescribed amount towards the attachment member; and the cam chain guide has an attachment hole at the attachment end section, the attachment member supporting the cam chain guide by fitting into the attachment hole, and said projections are formed at equal intervals along a periphery of the attachment hole.

14. The cam chain assembly of claim 13, wherein annular recesses for accepting deformation of the projections are formed adjacent the projections.

15. The cam chain assembly of claim 13, wherein said projections are formed on a side surface of the cam chain guide.

16. The cam chain assembly of claim 13, wherein said projections are formed at an inner peripheral surface of the attachment hole.

17. The cam chain assembly of claim 13, wherein the cam chain guide is made of resin and said projections are integrally formed with the cam chain guide.

18. The cam chain guide assembly of claim 13, wherein the cam chain guide is made of metal, and said projections are formed integrally at the attachment end section by a rubber member baked thereon.

* * * * *